United States Patent [19]

Richter

[11] Patent Number: 4,537,478
[45] Date of Patent: Aug. 27, 1985

[54] APODIZED MIRROR OPTICAL SYSTEM

[76] Inventor: Thomas A. Richter, 640 19th St., Manhattan Beach, Calif. 90266

[21] Appl. No.: 571,924

[22] Filed: Jan. 19, 1984

[51] Int. Cl.³ .......................... G02B 5/10; F21M 3/20
[52] U.S. Cl. ..................................... 350/611; 350/613; 350/620; 355/26; 355/67; 362/3
[58] Field of Search ............... 350/611, 613, 620, 619; 355/67, 26; 362/298, 3, 16

[56] References Cited

U.S. PATENT DOCUMENTS

| 503,004 | 8/1893 | Severy | 350/613 |
|---|---|---|---|
| 1,248,456 | 12/1917 | Clark | 350/613 |
| 4,066,887 | 1/1978 | Levis | 350/613 |
| 4,195,913 | 4/1980 | Dourte et al. | 350/613 |
| 4,389,115 | 6/1983 | Richter | 355/26 |

FOREIGN PATENT DOCUMENTS 329088  2/1903  France ............................. 350/619

Primary Examiner—Jon W. Henry
Attorney, Agent, or Firm—Allen A. Dicke, Jr.

[57] ABSTRACT

An optical system for producing substantially uniform illumination at an exposure plane has an apodized mirror in the form of a plurality of petals which can be individually adjusted to permit illumination intensity adjustment at the focal plane.

14 Claims, 4 Drawing Figures

APODIZED MIRROR OPTICAL SYSTEM

BACKGROUND OF THE INVENTION

This invention is directed to an apodized mirror optical system which includes a petal mirror which has individually adjustable petals for adjusting the distribution of the illumination intensity at the focal plane.

Electronic systems are being made more compact by employing printed circuit boards of continually more dense circuit arrangement. This permits the reduction in physical size of the electronic assembly. The exposure definition of photosensitive material has improved to permit the making of photo exposure masks of continually finer definition. In order to take advantage of the advances in masks, photosensitive material, etching and other arts, the optical exposure of the photosensitive resist must be proper. The exposure must be substantially uniform over the exposure area to provide substantially uniform photoresist development and consequent etching characteristics. The illumination provided for the exposure must be well collimated to provide a sharp exposure at the edge of each detail in the mask.

A previous optical system is disclosed in Thomas A. Richter U.S. Pat. No. 4,389,115. That optical system produces substantially uniform illumination at the exposure plane by employing an integrator mirror. That integrator mirror has a plurality of facets, but after the desired configuration of the integrator mirror is established, it is replicated as a single structural element. Dourte, et al., U.S. Pat. No. 4,195,913 describes that integrator mirror in more detail. Each facet of the integrator mirror is configured to deliver the beam over the entire exposure plane area.

It is desirable to employ an optical system which provides the desirable result of substantially uniform illumination at the exposure plane without the employment of an excessive number or of optically complicated parts.

SUMMARY OF THE INVENTION

In order to aid in the understanding of this invention, it can be stated in essentially summary form that it is directed to an apodized mirror optical system wherein a lamp has a reflector which directs light at an apodized mirror which is divided into petals. The petals are individually adjustable to control illumination distribution at the focal plane, and the petals can be adjusted to provide substantially uniform illumination, if desired.

It is, thus, an object and advantage of this invention to provide an apodized mirror optical system wherein the apodized mirror is divided into petals and the petals are individually adjustable to control illumination at the focal plane where exposure is to be made.

It is a further object and advantage of this invention to provide an optical system which has a minimum number of components and has no components of specialized optical form so that the optical system can be economically produced and maintained.

Other objects and advantages of this invention will become apparent from a study of the following portion of the specification, the claims and the attached drawings.

DESCRIPTION OF THE PREFERRED EMBODIMENT

Figure 1:
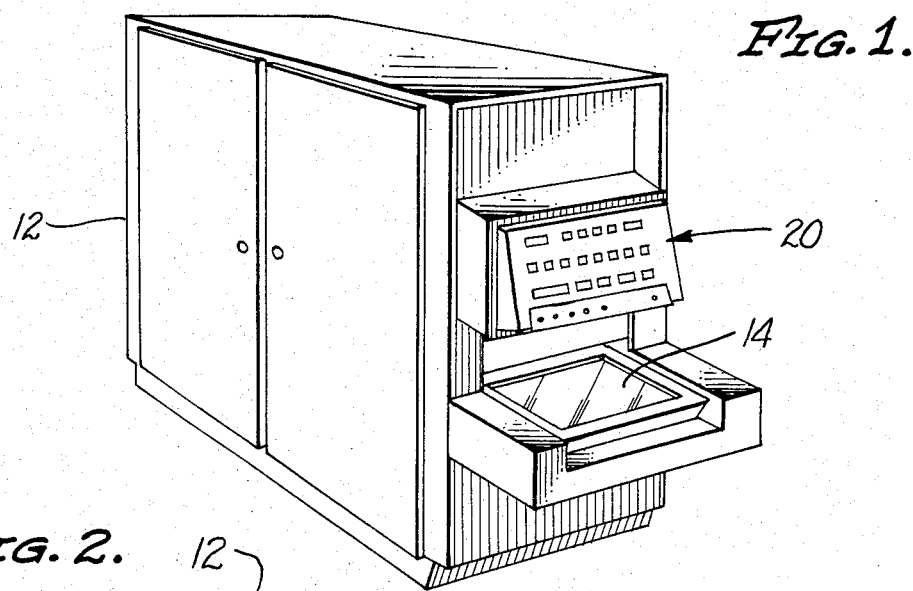
FIG. 1 is a perspective view of the housing which contains the optical system of this invention.
Figure 2:
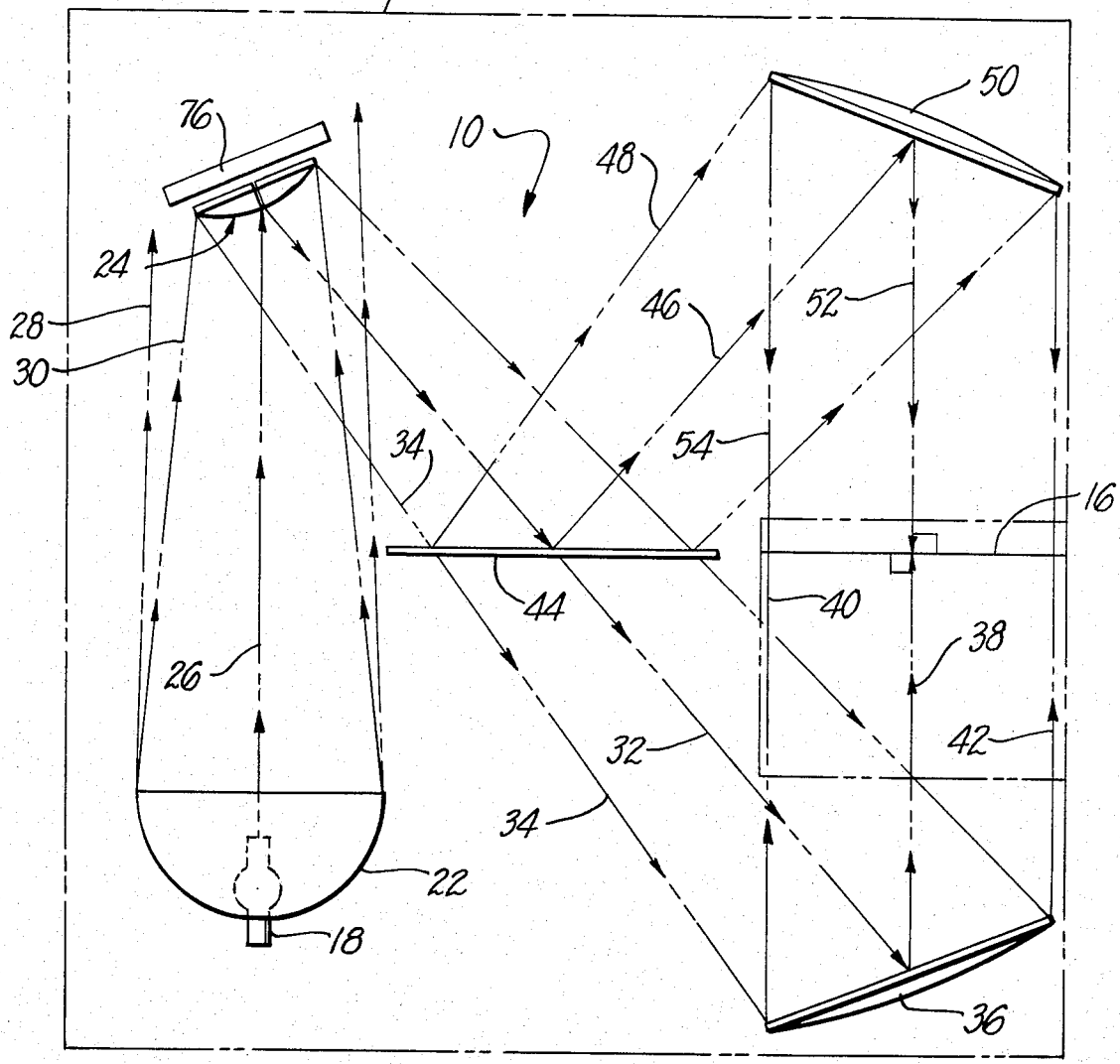
FIG. 2 is a schematic side elevational view of the optical system.

The apodized mirror optical system generally indicated at 10 in FIG. 2 is contained within housing 12 illustrated in FIG. 1. Tray 14 is movable to the position shown in FIG. 1, accessible from the exterior and, in this position, materials are loaded onto the tray. The materials are usually printed circuit boards carrying resist with a mask positioned thereover. The system 10 is designed for simultaneous exposure of both sides and, thus, tray 14 is transparent and the materials thereon can include a mask and photoresist on the lower side of the circuit board stock, as well as on the top side. When the materials are put in place, the tray is thrust into the interior of housing 12 where it lies on exposure plane 16. Exposure is initiated and controlled by appropriate circuitry powering short arc, high intensity mercury-Xenon arc lamp 18 and measuring illumination system intensity. The external controls for exposure are generally indicated at 20 in FIG. 1. The exposure and other details are described in my prior U.S. Pat. No. 4,389,115, the entire disclosure of which is incorporated herein by this reference.

Optical system 10 has high intensity short arc lamp 18 as its illumination source. Reflector 22 is positioned to embrace lamp 18 and to direct the light therefrom toward apodized petal mirror 24. Mirror 24 has a smaller diameter than reflector 22. Reflector 22 is preferably an elliptical reflector, but the cathode spot in arc lamp 18 is positioned below the focal point so that the rays delivered by reflector 22 are converging to a size slightly larger than the mirror 24 to apodize the beam. The center ray from reflector 22 to mirror 24 is indicated at 26. The outer ray 28 is lost into the interior housing 12 and ray 30 reflects on the outer edge of mirror 24.

Figure 3:
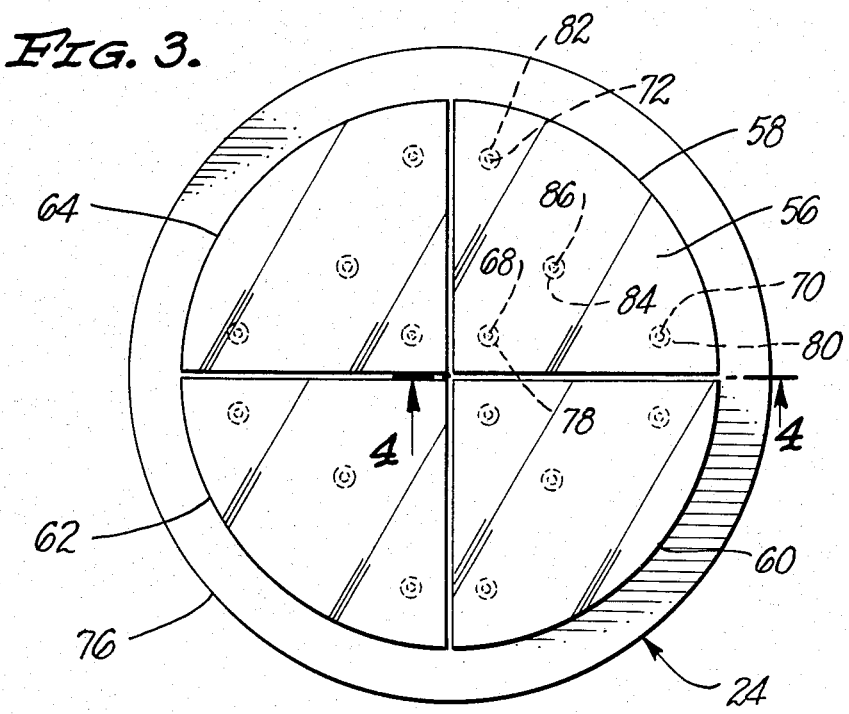
FIG. 3 is an enlarged plan view of the apodized petal mirror.
Figure 4:
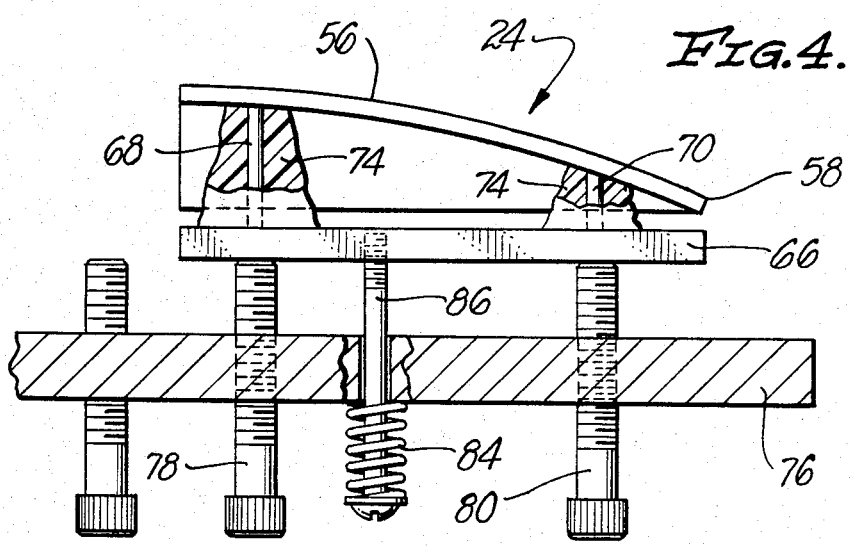
FIG. 4 is an enlarged sectional view, taken generally along the line 4—4 of FIG. 3, with parts broken away, showing the structural details of the metal mirror.

Mirror 24 is a convex sphere. As is later described and as is shown in FIGS. 3 and 4, mirror 24 is divided into a plurality of petals, with each petal being individually adjustable. The petals are adjusted to only a small amount away from the spherical configuration shown in FIG. 2. Center ray 32 reflects off of mirror 24 as does edge ray 34, which corresponds to ray 30. The convexity of petal mirror 24 is chosen so that the rays are divergent to concave collimation mirror 36. The reflected center ray 38 and edge ray 40 are parallel to each other. Furthermore, the size of the beam represented by these rays and the other edge ray 42 is such as to illuminate the entire bottom area of exposure plane 16. The beam is collimated for optimum precision of exposure of the resist from its mask.

Beam splitter 44 is positioned along the path of the beam from apodized petal mirror 24 to concave collimation mirror 36. Center ray 46 and side ray 48 correspond to rays 32 and 34 striking beam splitter 44. The beam represented by rays 46 and 48 is divergent and is directed to concave collimation mirror 50, which corresponds to the mirror 36 in curvature and position. The downwardly directed center ray 52 and side ray 54 represent a beam which is directed downward to exposure plane 16, is normal to the exposure plane, and is directly opposite and parallel to the upwardly directed beam from mirror 36. Thus, both sides of the exposure plane 16 receive illumination which is collimated.

Such an exposure system has a Gaussian distribution of energy across the exposure plane. In order to improve the energy distribution at the exposure plane, apodized petal mirror 24 is specially organized. Its surface 56 starts out as spherical. Mirror 24 is cut into a number of sections. For convenience of illustration, four sections or petals are cut from the original spherical mirror. FIG. 3 shows these petals at 58, 60, 62 and 64. A mounting plate is provided behind each petal. Mounting plate 66 is positioned behind petal 58, and a similar mounting plate is positioned behind each of the other petals. In the specific embodiment shown, mirror 24 is divided into quadrants, and the mounting plates may be in the form of quadrants cut out of a circular disc. Three pins on each mounting plate extend up to the mirror petal. Pins 68, 70 and 72 provide location points for the mirror petal. These pins and the pins under adjacent petals hold the petals into a substantially spherical position when the mounting plates are in planar alignment. Cement 74 is positioned generally in the area of the pins and extends from the mirror to the mounting plate to secure the mirror on the mounting plate.

Base plate 76 is secured within housing 12 to hold mirror 24 in position. Adjustment devices are provided between the base plate and the different mounting plates so that the individual petals of the mirror can be adjusted. In the present preferred embodiment, three screws 78, 80 and 82 interengage between the base plate and the mounting plate 66. The screws are triangularly positioned, preferably approximately into the corners of the petal, so that the petal can be rocked or tilted in the desired direction. Jack screws are shown and means is provided for resiliently urging the mounting plate toward the base plate. In the present case, spring 84 pulls downward on mounting plate 56 with respect to base plate 76 through tension bolt 86. The tension bolt is preferably located about midway between the jack screws 78, 80 and 82 to equalize loading.

The intensity of illumination across the beam between reflector 22 and mirror 24 is Gaussian. The low intensity fringes represented by outer ray 28 are lost by passing mirror 24 around its edges. The distribution of energy across the beam between mirror 24 and exposure plane 16 is no longer Gaussian because the petals of mirror 24 are individually adjusted to provide a more uniform intensity across the exposure plane 16. While the optimum settings of the petals could be calculated, the settings can be readily made by testing the illumination distribution at the exposure plane and individually manually adjusting the petals. Substantial uniformity of illumination can, thus, be achieved. The petal mirror permits the attainment of substantially uniform illumination energy distribution across the focal plane without the need for specially configured optical elements.

It is, thus, seen that an optical system which provides substantially uniform illumination energy distribution across the focal plane is provided. My prior U.S. Pat. No. 4,389,115 has more optical elements and a more complicated optical system. Placing all of the optical elements with the center rays in a single plane, as disclosed herein, makes for easier alignment, as well as achieving the desired fewer number of components. However, should it be helpful to the structure or attainable focal lengths, one or more folding mirrors can be employed between reflector 22 and petal mirror 24.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An optical system comprising:
   a lamp, a reflector positioned with respect to said lamp to provide a beam of illumination;
   a petal mirror on the path of said beam to reflect the beam;
   a collimating mirror on the path of the reflected beam;
   an exposure plane, said collimating mirror directing the reflected beam toward the exposure plane as a collimated beam, said petal mirror being adjusted so as to provide substantially uniform illumination intensity across said exposure plane.

2. The optical system of claim 1 wherein said reflector is elliptical.

3. The optical system of claim 2 wherein each of the petals of said petal mirror is a portion of the same spherical surface.

4. The optical system of claim 3 wherein said collimating mirror is a concave spherical mirror.

5. The optical system of claim 4 wherein there is a beam splitter positioned between said petal mirror and said spherical collimating mirror, said beam splitter dividing said reflected beam, there being a second collimating concave spherical mirror receiving reflection from said beam splitter, said collimating concave spherical mirrors being positioned on opposite sides of said exposure plane to illuminate said exposure plane from both sides with substantially uniform illumination intensity.

6. The optical system of claim 3 wherein said petal mirror comprises a plurality of portions of a convex mirror and each of said plurality of portions represents a petal, each said petal being mounted for individual adjustment so that beam intensity can be controlled across the exposure plane by individually directing petals of said petal mirror.

7. The optical system of claim 1 wherein said petal mirror comprises a plurality of portions of a convex mirror and each of said plurality of portions represents a petal, each said petal being mounted for individual adjustment so that beam intensity can be controlled across the exposure plane by individually directing petals of said petal mirror.

8. The optical system of claim 7 wherein said petal mirror comprises a plurality of mounting plates, each of said plurality of mounting plates carrying one of said petals, each of said plurality of mounting plates being adjustably mounted with respect to a base plate so that adjustment of each said mounting plates with respect to said base plate directs a petal of said petal mirror.

9. The optical system of claim 8 wherein each petal is positioned above its mounting plates on support pins and cement is positioned between each said petal and its mounting plate to firmly position each petal with respect to its mounting plate.

10. The optical system of claim 9 wherein there is a plurality of screws interengaged between said base plate and each of said mounting plates so that adjustment of said screws adjusts said petals with respect to said base plate.

11. An apodized mirror optical system comprising:
a lamp, a reflector positioned with respect to said lamp to provide a first beam;
an apodizing petal mirror positioned on the path of said first beam to reflect only a portion of said first beam to provide a second beam, said petal mirror being positioned to reflect substantially all of the interior of said first beam and not reflect the outer fringes of said first beam to said second beam;
a mirror positioned on the path of said second beam, an exposure plane, said mirror producing a collimated beam directed toward said exposure plate, said petal mirror having a plurality of individual petals which can be individually adjusted so as to provide substantially uniform distribution of illumination intensity across said exposure plane.

12. The apodized mirror system of claim 11 wherein said petal mirror comprises a plurality of petals cut from a spherical mirror, each of said plurality of petals being individually mounted so that each of said petals can be individually adjusted to control the distribution of illumination energy at said exposure plane.

13. The apodized mirror system of claim 12 wherein there is a mounting plate positioned with respect to each of said petals, each of said petals being mounted upon its mounting plate, each of said mounting plates being adjustably mounted with respect to a base plate to individually adjust the petals and retain them in adjusted position.

14. The apodized mirror system of claim 13 wherein each said mounting plate is adjusted with respect to said base plate by means of a plurality of jack screws interengaging therebetween.

* * * * *